United States Patent
Shih et al.

(10) Patent No.: US 6,563,889 B1
(45) Date of Patent: May 13, 2003

(54) METHOD AND APPARATUS FOR ADAPTING THE BOOST OF A READ CHANNEL FILTER

(75) Inventors: Shih-Ming Shih, San Jose, CA (US); Tzu-wang Pan, San Jose, CA (US); Richard A. Contreras, Los Altos, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/165,182

(22) Filed: Oct. 1, 1998

(51) Int. Cl.[7] ............................................. G11B 5/00
(52) U.S. Cl. ..................................................... 375/341
(58) Field of Search ................................... 375/232, 233, 375/341, 261, 262, 263, 229, 350; 714/795; 369/59; 371/40.1, 41; 360/7, 53; 333/166, 28 R; 327/552, 561

(56) References Cited

U.S. PATENT DOCUMENTS

| | | | |
|---|---|---|---|
| 5,060,088 A | * 10/1991 | Dolivo et al. | 360/46 |
| 5,341,387 A | * 8/1994 | Nguyen | 371/45 |
| 5,533,031 A | 7/1996 | Dounn et al. | 371/21.1 |
| 5,719,843 A | * 2/1998 | Nakajima et al. | 369/59 |
| 5,917,863 A | * 6/1999 | Soichi et al. | 375/341 |
| 6,005,507 A | * 12/1999 | Nakatsu et al. | 341/155 |
| 6,023,383 A | * 2/2000 | Glover et al. | 360/46 |
| 6,067,198 A | * 5/2000 | Zuffada et al. | 360/46 |
| 6,097,769 A | * 8/2000 | Sayiner et al. | 375/341 |
| 6,104,766 A | * 8/2000 | Coker et al. | 375/341 |
| 6,119,265 A | * 9/2000 | Hara | 714/795 |
| 6,130,793 A | * 10/2000 | Ohmori et al. | 360/53 |
| 6,188,735 B1 | * 2/2001 | Soichi et al. | 375/341 |
| 6,278,749 B1 | * 8/2001 | Jeon | 375/341 |
| 6,282,042 B1 | * 8/2001 | Hana et al. | 360/64 |
| 6,307,900 B1 | * 10/2001 | Choi | 375/341 |
| 6,393,598 B1 | * 5/2002 | Tsang et al. | 714/795 |

FOREIGN PATENT DOCUMENTS

| | | | |
|---|---|---|---|
| EP | 0147550 | 10/1985 | 20/10 |
| EP | 0595454 A2 | 4/1994 | 20/10 |
| JP | 090106626 A | 4/1997 | |

OTHER PUBLICATIONS

Cideciyan, Roy D.; Dolivo, Francois; Hermann, Reto; Hirt, Walter, "A PRML System for Digital Magnetic Recording", Jan. 1, 1992, IEEE Journal on Selected Areas in Communications.

Thapar, H.K. and Patel, A.M., "A Class of Partial Response Systems for Increasing Storage Density in Magnetic Recording", Sep. 1987, IEEE Transactions on Magnetics, vol. Mag–23, No. 5, p. 3666–3668.

* cited by examiner

*Primary Examiner*—Chi Pham
*Assistant Examiner*—Dung X. Nguyen
(74) *Attorney, Agent, or Firm*—Lathrop & Gage

(57) ABSTRACT

A system and method are disclosed for equalizing a read signal from a data storage media is disclosed. An analog output signal is equalized by reading the data storage media using an analog equalization filter. The analog output of the analog equalization filter is converted to a raw digital output signal. The raw digital output signal is processed to detect and correct an error in the raw digital output signal. The error is detected and an adjustment is made to the boost of the analog equalization filter according to the error detected.

23 Claims, 2 Drawing Sheets

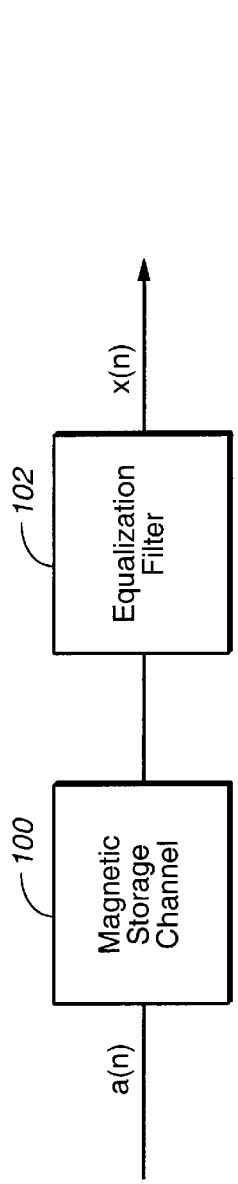
FIG._1
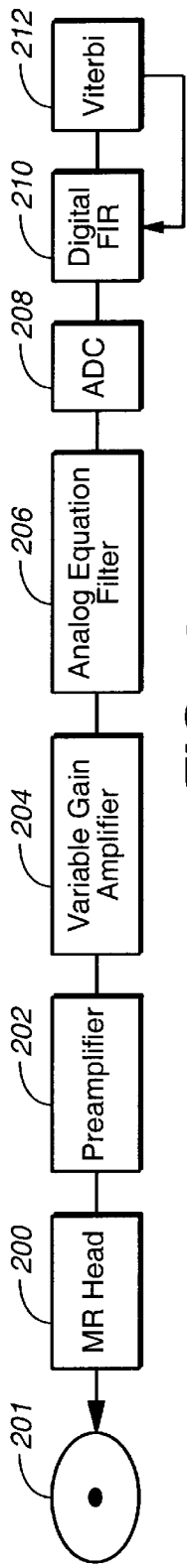
FIG._2
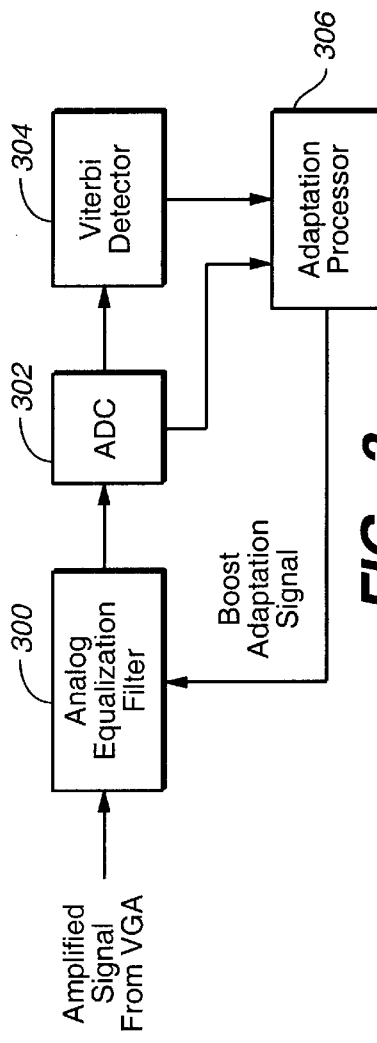
FIG._3

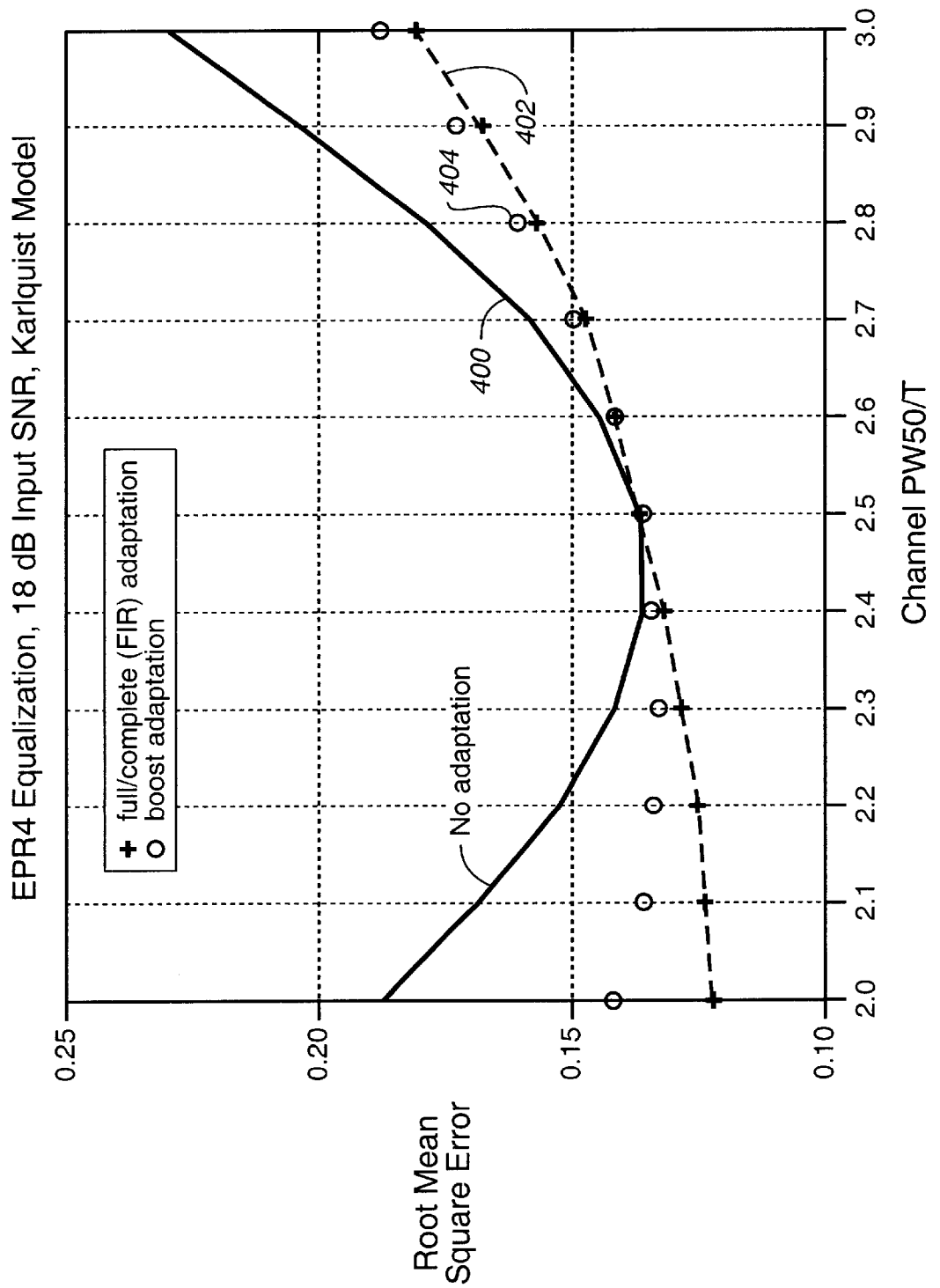
FIG._4

METHOD AND APPARATUS FOR ADAPTING THE BOOST OF A READ CHANNEL FILTER

BACKGROUND OF THE INVENTION

1. Field of the Invention

The present invention relates generally to data storage and retrieval systems. More specifically, a method is disclosed for adapting the properties of an analog equalization filter used in the read channel of a magnetic disc storage system. In one embodiment, an input from a magnetoresistive head is equalized using an adaptive filter that adapts to the changing properties of a magnetic disc reading system so that errors in the output of the system are minimized.

2. Description of the Related Art

As recording density and speed have increased for magnetic disc storage systems, more exact equalization of the signals read from magnetic storage discs has become necessary. Adaptive equalization has become an important technique that allows equalization to be tuned for the specific properties of a given magnetic storage and retrieval set of hardware. For example, as the fly height of the magnetic head used to read a magnetic disc changes over time, the properties of an adaptive equalization filter may be adapted to maintain the optimization of the equalization filter for the specific hardware associated with the equalization filter. Also, the properties of a magnetic storage disk may change over time, making it necessary to adapt the parameters of the equalization filter to maintain optimal system performance.

It should be appreciated that the adaptive equalization filter technique disclosed herein is applicable to many data storage and retrieval systems, including data storage systems using Partial Response signaling. In addition, it should also be noted that adaptive filter technique may also be used to improve equalization for a signal received from a communication channel. In one embodiment, the technique is used in an EPRML system for storing and retrieving information from a magnetic storage disk. For the purpose of clarity, that system is referred to throughout this description. It should be understood, however that the techniques described apply other data storage and data communication systems.

FIG. 1 is a block diagram illustrating a magnetic storage channel and equalization filter for a PRML system. A signal a(n) is the media code signal at time nT, where T is the channel symbol duration. The signal a(n) over time represents the sequence of binary symbols which are stored on and recovered from a magnetic storage channel 100. Magnetic storage channel 100 is also referred to as the media channel. If the system works ideally, then, after passing through magnetic storage channel 100 and an equalization filter 102, a(n) is transformed into x(n). x(n) is the ideal output when the channel is read for a given system. x(n) is determined by a transfer function that describes the intersymbol interference of the reading and writing system. In a real system, the output of the equalization filter is actually y(n), where y(n) differs from x(n) by an error amount. This error is described in further detail below. It should be noted that the read signal from the magnetic storage channel may be digitized either before or after equalization filter 102.

For a PRML system where the signal is equalized to the Class IV Partial Response and the maximum-likelihood (ML) detection is preformed with a Viterbi detector as described in Lee and Messerschmitt, Digital Communication, Kluwer Academic Press 1994, which is herein incorporated by reference for all purposes, the equalized noise-free sampled output is given by the difference equation:

$$x(n)=a(n)-a(n-2) \qquad \text{Equ. 1}$$

where x(n) is the output sample value at time nT, a(n) is the media code at time nT, and T is the channel symbol duration. The input symbols a(n) are picked from the binary set {0,1}. The noise-free output sample values are ternary, namely, 0, +1, or −1. Equ. 1 is referred to as the partial response polynomial and may also be represented as the transfer function $1-D^2$ where D represents 1 unit time delay. $1-D^2$ is the standard PRML transfer function that describes the result of the prescribed intersymbol interference that characterizes PRML. The inverse of $1-D^2$ is represented as $1/(1-D^2)$.

Other transfer functions exist for other systems which implement different partial response targets. The transfer function for EPRML when the signal is equalized to the Extended Class IV Partial Response is $1+D^1-D^2-D^3$ and is derived according to the extended partial response polynomial:

$$x(n)=a(n)+a(n-1)-a(n-2)-a(n-3) \qquad \text{Equ. 2}$$

As mentioned above, the output of the equalization filter in a real system does not match this x(n) exactly. One cause of errors is a mismatch between the transfer function of the equalization filter and the physical characteristics of the media channel. This causes distortion in x(n), resulting in actual output signal y(n) that differs from x(n) by an error amount, e(n). As noted above, it has become necessary in many systems to provide some sort of adaptive equalization to account for both variations in a manufactured disc drive within manufacturing tolerances and variations of individual disc drives over time as wear occurs or ambient environmental conditions change.

FIG. 2 is a block diagram illustrating a read channel processing system for a magnetic storage system that includes adaptive equalization as it is currently practiced. A magnetoresistive head 200 flies above and reads a signal from a magnetic storage disc 201. The signal from the magnetoresistive head 200 is input to a variable gain amplifier 204 that amplifies the analog signal prior to equalization and conversion of the signal to a digital signal.

The output of the variable gain amplifier 204 is fed to an analog equalization filter 206. Equalization of the signal read from the magnetic disc is performed according to the specific read/write scheme used to record data on the disc. As mentioned above, a number of coding schemes have been developed for encoding data onto magnetic discs in a manner that controls the inter-symbol interference of data located in adjacent storage locations. Some of the systems devised include Partial Response Maximum Likelihood (PRML), extended PRML (EPRML) and a specific version of EPRML used in one embodiment referred to as EPR4. Once the analog signal is equalized, it is input to an analog-to-digital (ADC) converter 208.

As mentioned above adaptive equalization is required in some systems to maintain acceptable performance. Therefore, the digital signal output from ADC 208 is input to a digital finite impulse response (FIR) filter that processes the digital signal prior to inputting the signal to a Viterbi detector 212. The digital FIR filter receives feedback from Viterbi detector 212 for the purpose of adjusting the filter parameters of the digital FIR filter. In this manner, the filter parameters of the digital FIR filter are optimized for the specific properties of the magnetic disc reading system that exists at the time that a magnetic disc is being read.

This adaptive equalization filter architecture is effective to optimize the equalization and maintain system performance as the hardware characteristics of the system vary over time. However, the inclusion of the digital FIR filter 210 in the system adds both complexity and cost. Generally, it is believed that this added costs and complexity is necessary to provide effective adaptive equalization that maintains the performance of the system. What is needed is a simpler and less costly method of providing adaptive equalization in such a system while still maintaining the performance of the system and keeping a low data error rate.

SUMMARY OF THE INVENTION

Accordingly, a system and method is disclosed for adapting an analog equalization filter prior to digitizing the read channel signal in a magnetic disc read channel system. The method disclosed adapts the boost of an analog equalization filter. It is shown that such adaptation is sufficient to maintain the performance of the read channel system without including a digital FIR filter. This result enables the system to be more simple and less costly since the need for a digital FIR filter component may be eliminated entirely. Several methods are disclosed for adapting the boost of the analog equalization filter based on an error signal derived form the output of a Viterbi detector and the raw output from an ADC.

In one embodiment, a method of adaptively equalizing a read signal from a data storage media is disclosed. An analog output signal is equalized by reading the data storage media using an analog equalization filter. The analog output of the analog equalization filter is converted to a raw digital output signal. The raw digital output signal is processed to detect and correct an error in the raw digital output signal. The error is detected and an adjustment is made to the boost of the analog equalization filter according to the error detected.

In another embodiment, a system for adaptively equalizing a read signal from a data storage media is disclosed. The system includes an adaptive analog equalization filter having an adjustable boost. An analog to digital converter converts the output of the adaptive analog equalization filter to a raw digital signal. A Viterbi detector for detecting errors in the raw digital signal has an output that outputs a corrected signal. An adaptation processor compares the raw digital signal to the corrected signal that is output from the Viterbi detector and generates a boost adjustment signal that is input to the adaptive analog equalization filter. Thus, the adaptive analog equalization filter is adjusted to minimize the errors detected by the Viterbi detector.

BRIEF DESCRIPTION OF THE DRAWINGS

FIG. 1 is a block diagram illustrating a magnetic storage channel and equalization filter for a PRML system.

FIG. 2 is a block diagram illustrating a read channel processing system for a magnetic storage system that includes adaptive equalization as it is currently practiced.

FIG. 3 is a block diagram illustrating an adaptive equalization system that adapts the boost of an analog equalization filter to optimize equalization for an EPR4 magnetic disc read channel.

FIG. 4 is a graph illustrating how boost adaptation may be used to enhance the performance of an EPR4 system.

DETAILED DESCRIPTION OF THE PREFERRED EMBODIMENTS

FIG. 3 is a block diagram illustrating an adaptive equalization system that adapts the boost of an analog equalization filter to optimize equalization for an EPR4 magnetic disc read channel. An analog equalization filter 300 receives an amplified signal from a variable gain amplifier. The output of analog equalization filter 300 is input to an ADC 302. The output of ADC 302 is input to a Viterbi detector 304. Viterbi detector 304 determines the most likely data sequence encoded by the write channel of the EPR4 system based on the read signal. The raw digital output of the ADC is compared to the encoded signal recovered by the Viterbi detector by an adaptation processor 306. Adaptation processor 306 then derives a boost adjustment signal based on the nature of the error in the raw system determined by the Viterbi detector. The boost adaptation signal is input to analog equalization filter 300 and the boost of analog equalization filter 300 is adjusted until the system is optimized using negative feedback to minimize the error determined by the Viterbi detector.

In one embodiment, a seventh order equiripple low pass filter with two programmable zeros is used for analog equalization filter 300. The transfer function of the filter may be represented by equation 3.

$$F(S) = \frac{b_o + b_1 S - b_2 S^2}{H(S)} \qquad \text{Equ. 3}$$

The boost of the filter is determined by b2. It should be appreciated that in other embodiments, other analog filters may be used. In general, the design of analog equalization filters is well known and methods of varying the boost of such filters have been developed. Analog filters may generally be characterized according to their boost and cut off frequency. Cut off frequency is usually defined as the point at which the filter attenuates some portion of the signal, usually half. The boost of the filter refers to the amount that the filter response is enhanced at high frequencies. Analog filter design is described generally in De Veirman, G. A., and Yamaski, R., "A 27 MHz Programmable Bipolar 0.05° Equiripple Linear-Phase Lowpass Filter", ISSCC Digest of Technical Papers, pp. 64–65, February 1992 and Rezzi, F. et al., "A 70 mW Seventh-Order Filter with 7–50 MHz Cutoff Frequency and Programmable Boost and Group Delay Equalization", IEEE J. of Solid-State Circuits, Vol. 32, No. 12, pp. 1987–1999, December 1997 and Khoury, J. M., "Design of a 15-MHz CMOS Continuous-Time Filter With On-Chip Tuning", IEEE J. of Solid-State Circuits, Vol. 26, No. 12, pp. 1988–1997, December 1991 which are herein incorporated by reference. Inone embodiment, a boost filter such as is described in U.S. Provisional Patent Application No. 60/102,524 filed on Sep. 30, 1998, which is herein incorporated by reference for all purposes, is used.

Thus, an analog filter may be designed that has a variable boost that may be controlled by sending a control signal to the analog filter. Next, a method for deriving the control signal from the output of the Viterbi detector and, ADC will be described.

A Viterbi detector determines the most likely input sequence a(n) that was written to the storage media given the output signal that was read. In an EPR4 system, the ideal output of the read channel x(n) is a function of several data elements in an input data sequence represented by a(n). The real output of the read channel, including errors is y(n). The equation that describes the target output for an $E^2PR4$ system is shown in equation 4.

$$a(n)+2a(n-1)-2a(a-3)-a(n-4) \qquad \text{Equ. 4.}$$

x(n) is the value derived from the a(n) determined by the Viterbi detector that corresponds to the most likely sequence of a(n) input to the write channel. It should be noted that x(n) derived from the Viterbi may in fact be inaccurate, but for the purpose of adapting the equalization filter, x(n) derived from the a(n) output from the Viterbi detector is assumed to be correct. In other embodiments, additional error correction methods are implemented and those results are taken into account by the adaptation process. The Viterbi detector performs some error correction on the output by determining that certain data points are incorrectly read based on the value of subsequent data points, so x(n) derived from the Viterbi detector output generally may vary from y(n) output from the ADC.

Thus, the output of the Viterbi detector x(n) may differ from the raw output of the read channel at the analog-to-digital converter, which is referred to as y(n). Two major causes or errors are noise and mis-equalization. Mis-equalization is worse when the equalization filter is not adaptive. Over time, errors increase as the equalization becomes less well matched to the channel.

$$e(n)=y(n)-x(n) \qquad \text{Equ. 5}$$

In general, a detected error signal e(n) may be defined as the difference between the output of the analog-to-digital converter and the output of the Viterbi detector as is shown in equation 5. Using the error signal derived in equation 5, equations for adapting the boost of the analog filter such as equations 6A–6C may be defined. Equations 6A–6C require that the next updated boost value, $b_2(n+1)$, equal the most recent boost value, $b_2(n)$, plus $\mu$ multiplied by the error detected multiplied by some function of either the values in the sequence of values read from the Viterbi detector, x(n), or the values in the sequence of values output from the ADC, y(n). Also, the function could be a function of a mixture of the values in the sequence of values output from the Viterbi detector and the values in the sequence of values output from the ADC.

$$b2(n+1)=b2(n)+\mu e(n)(f(y_{(n)}, y_{(n-1)}, y_{(n-2)} \ldots)) \qquad \text{Equ 6A}$$

$$b_2(n+1)=b_2(n)+\mu e(n)(f(x_{(n)}, x_{(n-1)}, x_{(n-2)} \ldots)) \qquad \text{Equ 6B}$$

$$b_2(n+1)=b_2(n)+\mu e(n)(f(x_{(n)}, y_{(n)}, x_{(n-1)}, y_{(n-1)})) \qquad \text{Equ 6C}$$

In general, it is possible use a measure of the error and some indication of the direction in which the boost should be adjusted to derive a boost adjustment. Using a boost adapting method, it is possible to control the boost of the analog filter and keep the read channel operating in an optimal manner. Next, some specific implementations of a boost adapting method described generically by equations 6A through 6C are described.

In one embodiment, the boost of the analog filter is adjusted by either adding or subtracting a boost adjustment amount $\mu$ where the sign of the operation for adding or subtracting $\mu$ is determined by multiplying the sign of the error times the sign of the sum of the sample before the sample for which the error was calculated and the sample after the sample for which the error was calculated. Thus, the amount of boost is ether incremented or decremented by an amount, $\mu$, depending on whether the measured error was positive or negative and depending on whether the immediately preceding point and immediately following data point determined by the Viterbi detector are more positive or more negative. In this manner, negative feedback is created and the boost is adjusted to a value that minimizes the detected error after a number of iterations. It should be noted that the parameter $\mu$ may be selected or tuned for different systems. In general, as the magnitude of $\mu$ increases, the filter adapts more quickly, but may become unstable. When $\mu$ is smaller, the filter does not adapt as quickly but may be more stable. In general, it is possible to tune the value of $\mu$ selected to obtain the control characteristic that is desired.

Equation 7 illustrates a method of obtaining a boost adjustment amount. The boost adjustment amount is either incremented or decremented by the quantity $\mu$ multiplied by the amount of error detected times the sign of the sum of the immediately preceding detected value and the immediately following detected value of the point for which the error was determined. Equation 8 is a system similar to equation 7, with the added feature that the amount of change to the boost for a given detected error is proportional to the amount of error detected.

$$b_2(n+1)=b_2(n)+\mu(\text{Sign}[e(n)] \cdot \text{Sign}[x(n-1)+x(n+1)]) \qquad \text{Equ. 7}$$

$$b_2(n+1)=b_2(n)+\mu(e(n) \cdot \text{Sign}[x(n-1)+x(n+1)]) \qquad \text{Equ. 8}$$

In one embodiment, the amount that the boost is adjusted is determined according to Equation 9.

$$b_2(n+1)=b_2(n)+\mu(\text{Sign}[e(n)] \cdot [x(n-1)+x(n+1)]) \qquad \text{Equ. 9}$$

Equation 9 determines the amount that the boost should be adjusted by taking the sign of the detected error multiplied by the sum of the data points immediately preceding and following the point for which the error was detected. Also, Equation 10 may be used which adjusts the boost by a quantity determined by multiplying the detected error by the sum of the data points immediately preceding and following the data point for which the error was determined. Finally, Equation 11 may be used to adjust the boost as well. In Equation 11, the amount that the boost is adjusted is determined by multiplying the detected error by the sum of the immediately preceding and following points output from the ADC.

$$b_2(n+1)=b_2(n)+\mu(e(n)[x(n-1)]+x(n+1)) \qquad \text{Equ. 10}$$

$$b_2(n+1)=b_2(n)+\mu(e(n)[y(n-1)+y(n+1)]) \qquad \text{Equ. 11}$$

It should be noted that Equation 11 differs from the other examples given in that it is not a function of the output of the Viterbi detector but is instead a function of the output of the ADC. It should be noted that other equations are used to derive the boost adjustment amount in other embodiments. In general, it is desired that a boost adjustment amount be determined that provides negative feedback from the error detected by the Viterbi detector to the adaptive equalization filter so that the rate of errors detected by the Viterbi detector eventually is minimized. The boost adjustment amount may be derived from the amount of error detected, the surrounding points detected by the Viterbi detector, the surrounding points output from the ADC, or a combination of those parameters. The manner in which negative feedback is provided may be adjusted until the system is optimized to minimize the error determined by the Viterbi detector.

FIG. 4 is a graph illustrating how boost adaptation may be used to enhance the performance of an EPR4 system. The y axis of the graph illustrates the root mean square error rate determined for a channel having a given characteristic PW50/T. PW50/T is plotted on the x axis. PW50/T is the pulse width of a pulse generated by the recording system divided by the period between data samples. In general, PW50/T is a good measure of the characteristics of the read/write system. As the read/write system ages over time, PW50/T for the system varies. A plot 400 shows the performance of an EPR4 system that does not include adaptive equalization. The equalization of the system shown is set for a PW50/T of 2.5. As can be seen; as the PW50/T varies from 2.5 in either direction, the RMSE rate increases and the performance of the system degrades. Thus, any variance in PW50/T over time for such a system degrades the system performance.

The performance of an EPR4 system that includes a fully adapted equalized filter such as an additional adaptive FIR filter is shown on plot 402. Although the performance of the system still slowly degrades as PW50/T increases, the performance is generally much better than the performance of a system that does not include adaptation. However, as noted above, such complete adaptation is costly and complex. Plot 404 shows the performance of an EPR4 system that includes only boost adaptation for the equalization filter. The performance is nearly as good as the performance of a fully adaptive equalization filter. Thus, boost adaptation may be used to enhance performance of an EPR4 read system almost as much as full adaptation while providing significant savings in cost and complexity.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the adaptive equalization scheme described is also applicable to other magnetic storage systems besides PRML and EPRML systems. Also, the adaptive equalization scheme described is also applicable to other media storage systems such as optical storage systems. Accordingly, the present embodiments are to be considered as illustrative and not restrictive, and the invention is not to be limited to the details given herein, but may be modified within the scope and equivalents of the appended claims.

What is claimed is:

1. A method of adaptively equalizing a read signal from a data storage media, comprising:

equalizing an analog output signal obtained by reading the data storage media using an analog equalization filter;

converting the analog output of the analog equalization filter to a raw digital output signal comprising a sequence of data points;

processing the raw digital output signal to detect and correct an error in the raw digital output signal;

determining a measure of the error detected; and making an adjustment to the boost of the analog equalization filter according to the error detected from each data point of said sequence of data points, wherein the step of making the adjustment includes the step of multiplying said measure of the error detected from said each data point by a sum of a preceding point value corresponding to a preceding data point preceding said each data point and a succeeding point value corresponding to a succeeding data point succeeding said each data point.

2. A method of adaptively equalizing a read signal from a data storage media as recited in claim 1 wherein the error is detected using a Viterbi detector.

3. A method of adaptively equalizing a read signal from a data storage media as recited in claim 1 wherein the error detected is an rms error.

4. A method of adaptively equalizing a read signal from a data storage media as recited in claim 1 wherein the data storage media is a magnetic disk.

5. A method of adaptively equalizing a read signal from a data storage media as recited in claim 1 wherein the read signal is generated in a PRML system.

6. A method of adaptively equalizing a read signal from a data storage media as recited in claim 1 wherein the read signal is generated in an EPRML system.

7. A method of adaptively equalizing a read signal from a data storage media as recited in claim 1 wherein the analog equalization filter is a seventh order equiripple low pass filter.

8. A method of adaptively equalizing a read signal from a data storage media as recited in claim 1 wherein making an adjustment to the boost of the analog equalization filter according to the error detected from said data point further includes multiplying said measure of the error detected by a factor that determines how much the boost of the analog equalization filter is adjusted.

9. A method of adaptively equalizing a read signal from a data storage media as recited in claim 1 wherein the sign of the adjustment made to the boost of the analog equalization filter is determined by the sign of the error detected.

10. A method of adaptively equalizing a read signal from a data storage media as recited in claim 1 wherein the sign of the adjustment made to the boost of the analog equalization filter is determined by the sign of the sum of the preceding point value and the succeeding point value.

11. A system for adaptively equalizing a read signal from a data storage media, comprising:

an adaptive analog equalization filter having an adjustable boost;

an analog to digital converter that converts the output of the adaptive analog equalization filter to a raw digital signal comprising a sequence of data points;

a Viterbi detector for detecting errors in the sequence of data points of the raw digital signal, the Viterbi detector having an output that outputs a corrected signal; and an adaptation processor that compares the raw digital signal to the corrected signal that is output from the Viterbi detector an generates a boost adjustment signal that is input to the adaptive analog equalization filter; whereby the adaptive analog equalization filter is adjusted by multiplying a measure of the errors detected from each data point of said sequence of data points by a sum of a preceding point value corresponding to a preceding data point preceding said each data point and a succeeding point value corresponding to a succeeding data point succeeding said each data point to minimize the errors detected by the Viterbi detector.

12. A system for adaptively equalizing an analog read signal from a data storage media, including:

an equalizer configured for filtering the analog read signal;

an analog to digital converter communicatively connected to the equalizer for converting the analog read signal into a digital read signal comprising a sequence of data points; and a processor communicatively connected to the analog to digital converter for detecting errors in the sequence of data points of the digital read signal and providing a feedback signal to adjust the equalizer and adaptively minimize the errors, the feedback signal including a boost adjustment to the equalizer formed by multiplying a measure of the errors detected from each data point of said sequence of data points by a sum of a preceding point value corresponding to a preceding data point preceding said each data point and a succeeding point value corresponding to a succeeding data point succeeding said each data point.

13. The system of claim 12, wherein the processor includes:

a Viterbi detector communicatively connected to the analog to digital converter for detecting the errors of the digital read signal to generate a corrected signal, and a comparator communicatively connected to the Viterbi detector for comparing the digital read signal to the corrected signal to generate the feedback signal.

14. The system of claim 12, wherein the data storage media includes a magnetic disk.

15. The system of claim 12, further including a signal generator communicatively connected to the equalizer for generating the analog read signal, the signal generator including a PRML component.

16. The system of claim 12, further including a signal generator communicatively connected to the equalizer for generating the analog read signal, the signal generator including an EPRML component.

17. The system of claim 12, wherein the equalizer includes a low pass filter.

18. A system for adaptively equalizing an analog signal, including:

an equalizer configured for filtering the analog signal;

an analog to digital converter communicatively connected to the equalizer for converting the analog signal into a digital signal comprising a sequence of data points with a run length limited code of d equal to zero or greater, where d is a run length condition; and a processor communicatively connected to the analog to digital converter for detecting errors in the sequence of data points of the digital signal and providing a feedback signal to adjust the equalizer and adaptively minimize the errors.

19. The system of claim 18, wherein the processor includes:

a Viterbi detector communicatively connected to the analog to digital converter for detecting the errors of the digital signal to generate a corrected signal; and a comparator communicatively connected to the Viterbi detector for comparing the digital signal to the corrected signal to generate the feedback signal, the feedback signal including a boost adjustment to the equalizer formed by multiplying a measure of the errors detected from each data point of said sequence of data points by a sum of a preceding point value corresponding to a preceding data point preceding said each data point and a succeeding point value corresponding to a succeeding data point succeeding said each data point.

20. The system of claim 19, wherein the boost adjustment is formed according to the equation $b_2(n+1)=b_2(n)+\mu(\text{Sign}[e(n)]\cdot[x(n-1)+x(n+1)])$, where $b_2$ is a boost adjustment value, n is a particular data point of the sequence of data points, $\mu$ is a selectable boost amount constant, e is an error signal, x is an ideal output signal of the equalizer, and y is an actual output signal of the equalizer.

21. The system of claim 18, wherein the equalizer includes a low pass filter.

22. A method of adaptively equalizing a read signal from a data storage media as recited in claim 8 wherein making an adjustment to the boost of the analog equalization filter according to the error detected from each data point further includes making the adjustment according to the equation $b_2(n+1)=b_2(n)+\mu(\text{Sign}[e(n)]\cdot[x(n-1)+x(n+1)])$, where $b_2$ is a boost adjustment value, n is a particular data point of the sequence of data points, $\mu$ is a selectable boost amount constant, e is an error signal, x is an ideal output signal of equalizing, and y is an actual output signal generated by equalizing.

23. The system of claim 13, wherein the boost adjustment is formed according to the equation $b_2(n+1)=b_2(n)+\mu(\text{Sign}[e(n)]\cdot[x(n-1)+x(n+1)])$, where $b_2$ is a boost adjustment value, n is a particular data point of the sequence of data points, $\mu$ is a selectable boost amount constant, e is an error signal, x is an ideal output signal of the equalizer, and y is an actual output signal of the equalizer.

* * * * *